No. 772,320. PATENTED OCT. 11, 1904.
W. J. WRIGHT.
REVERSING GEAR MECHANISM.
APPLICATION FILED FEB. 19, 1904.
NO MODEL. 2 SHEETS—SHEET 1.

WITNESSES:
F. C. Gibson.
John T. Schrott.

INVENTOR
William J. Wright.
BY
Fred G. Dieterich
ATTORNEYS

No. 772,320. PATENTED OCT. 11, 1904.
W. J. WRIGHT.
REVERSING GEAR MECHANISM.
APPLICATION FILED FEB. 19, 1904.
NO MODEL. 2 SHEETS—SHEET 2.

WITNESSES:
F. C. Gibson.
John T. Schrott.

INVENTOR
William J. Wright.
BY
Fred G. Dieterich
ATTORNEYS

No. 772,320. Patented October 11, 1904.

UNITED STATES PATENT OFFICE.

WILLIAM J. WRIGHT, OF PITTSBURG, PENNSYLVANIA, ASSIGNOR TO THE WRIGHT REVERSE COMPANY, A CORPORATION OF WEST VIRGINIA.

REVERSING-GEAR MECHANISM.

SPECIFICATION forming part of Letters Patent No. 772,320, dated October 11, 1904.

Original application filed July 9, 1903, Serial No. 164,821. Divided and this application filed February 19, 1904. Serial No. 194,369.

(No model.)

*To all whom it may concern:*

Be it known that I, WILLIAM JAMES WRIGHT, residing at Pittsburg, in the county of Allegheny and State of Pennsylvania, have invented certain new and useful Improvements in Reversing-Gear Mechanisms, of which the following is a specification.

This invention relates to certain new and useful improvements in reversing-gear mechanisms, more especially adapted for use upon the drive-shaft of explosive and other engines for changing the direction of movement of the belt-driving gear actuated by the said drive-shaft, and this application is a division of my pending application, filed July 9, 1903, Serial No. 164,821, for reversing-clutch mechanism.

The invention disclosed in this present application comprises generally a shaft, a plurality of pulleys loosely mounted thereon, each of which has a gear-rim and a clutch-flange, an idler-gear which connects with the gear-rims of the said pulleys, and clutch-bands carried by the shaft for engaging the clutch-flanges of the said pulleys at predetermined times.

My invention also consists in certain features of construction and combination of parts, which will be hereinafter explained, and specifically pointed out in the appended claims, and illustrated in the accompanying drawings, in which—

Figure 1:
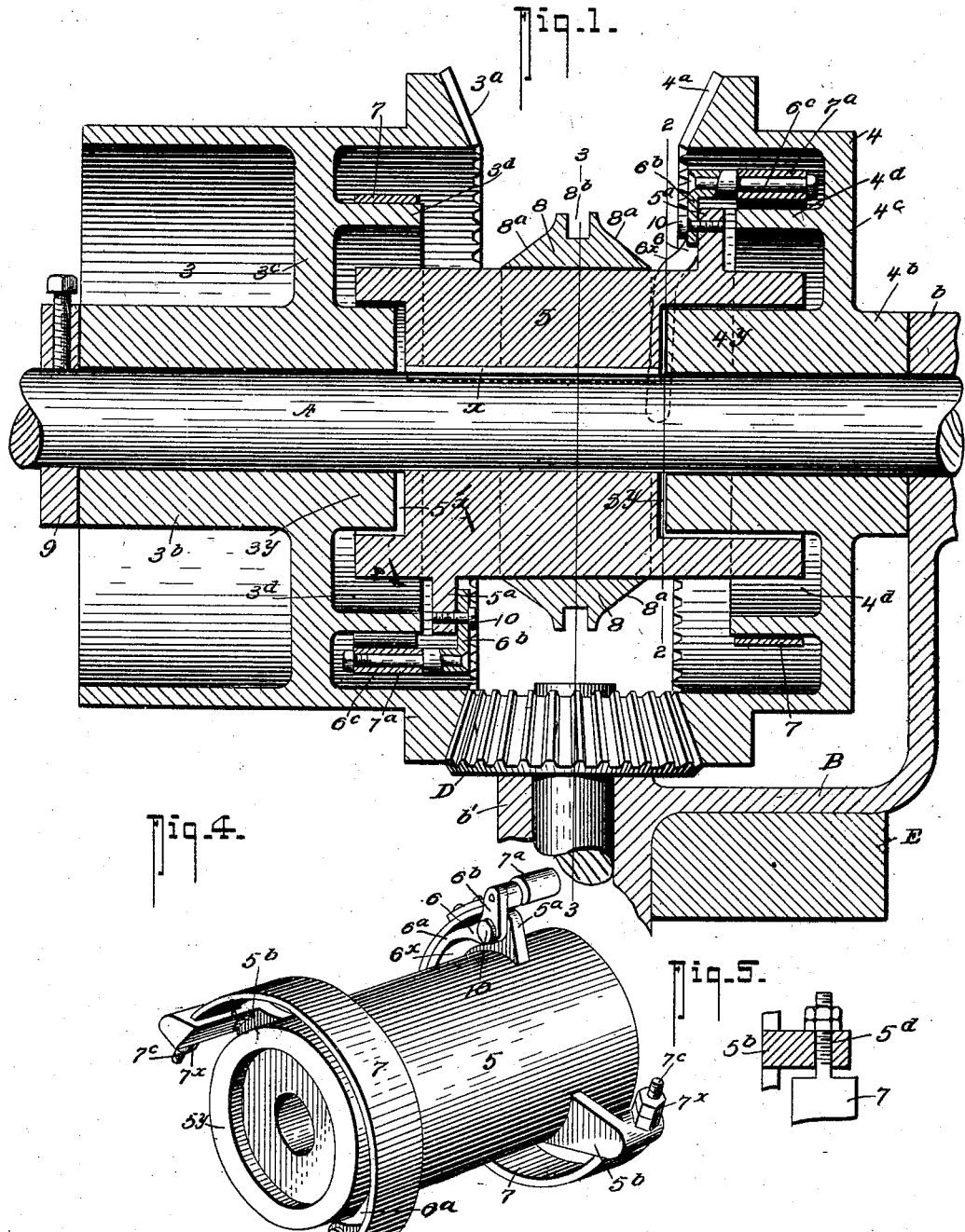
Figure 2:
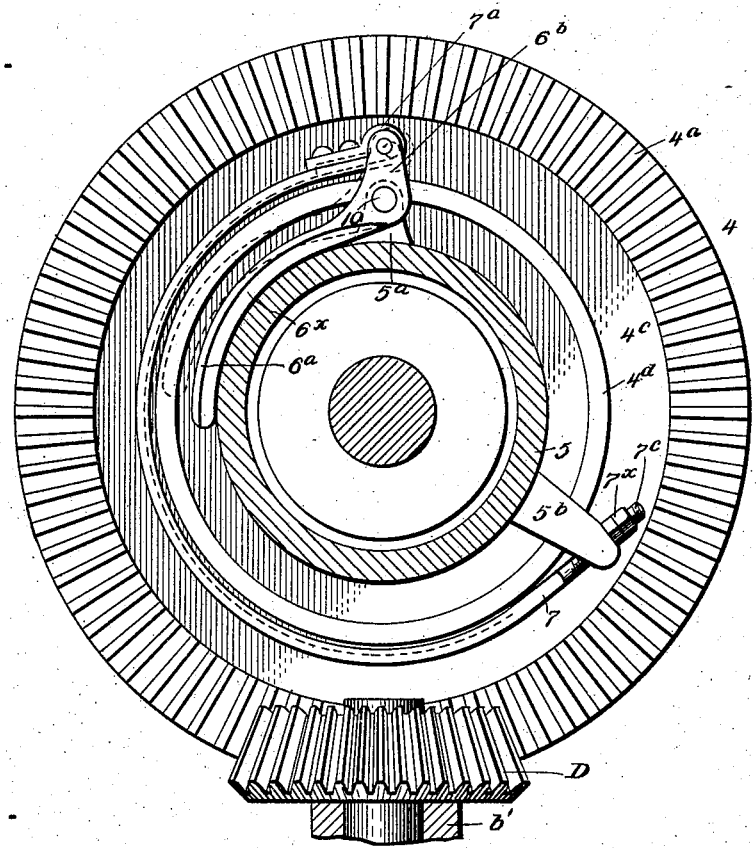
Figure 3:
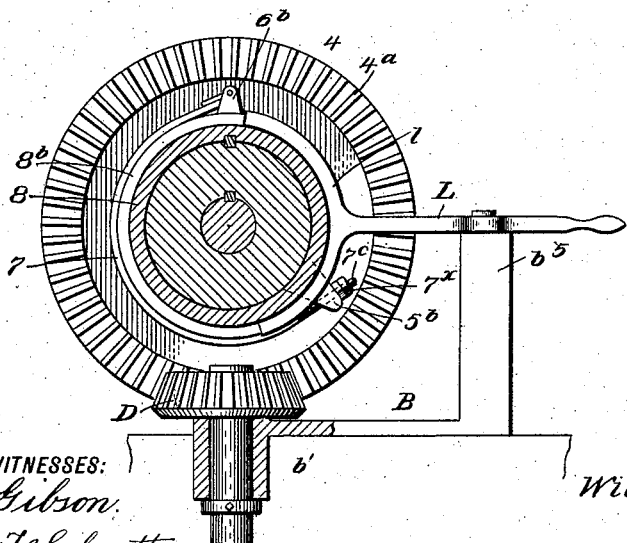

Figure 1 is a vertical longitudinal section of my invention. Fig. 2 is a cross-section taken on the line 2 2 of Fig. 1. Fig. 3 is a similar view taken on the line 3 3 of Fig. 1. Fig. 4 is a detail perspective view of the clutch-band-carrying hub, and Fig. 5 is a detail view hereinafter specifically referred to.

In the drawings, in which like numerals and letters of reference indicate like parts in all of the figures, A designates a shaft upon which is loosely mounted a main or drive pulley 3, having a gear-rim $3^a$, a hub $3^b$, and a web $3^c$. (See Fig. 1.) The hub $3^b$ has an extension $3^y$ for a purpose presently to appear. The pulley 3 is loosely mounted upon the shaft A and is prevented from endwise movement by a collar 9 and a hub 5, hereinafter again referred to. On the inner face of the web $3^c$ is a clutch flange or rim $3^d$ for a purpose presently to appear. 4 designates an opposing clutch-pulley, also loosely mounted upon the shaft A, having a gear-rim $4^a$, a hub $4^b$, and web $4^c$, upon the inner side of which is a clutch flange or rim $4^d$, as shown. The gear-rims $3^a$ $4^a$ are coöperatively joined by an idler-gear D, mounted in a bearing portion $b'$ of the bracket B, mounted on a suitable support E. On a second bearing $b$ of the bracket B is mounted the shaft A. Secured to rotate with the shaft A by a key $x$ is a hub 5, having enlarged bores $5^x$ $5^y$ to loosely receive the extensions $3^y$ $4^y$ of the hubs $3^b$ $4^b$.

$5^a$ $5^a$ designate a pair of oppositely-disposed ears on the hub 5, to each of which is pivoted a lever 6, having a short crank-arm $6^b$ and a curved arm $6^a$ with a cam-face $6^x$ for coöperating with the cam-face $8^a$ of the clutch 8, as will be presently fully explained. The clutch-flange-engaging band 7 is secured at one end $7^a$ to the outer end of the arm $6^b$ by a bolt or pin $6^c$, (see Fig. 1,) and the said band 7 has its opposite end terminating in the straight bolt $7^c$, which passes through an aperture $5^d$ in the lugs $5^b$ on the hub 5 and which is held in position by the nuts $7^x$ $7^x$. (Shown in detail in Fig. 5.) One of the bands 7 coöperates with the clutch-flange $3^d$, while the other band 7 coöperates with the clutch-flange $4^d$, as will be clearly understood by reference to Fig. 1.

Keyed to the hub 5, but adapted for endwise movement, is a clutch member 8, having a groove $8^b$ to receive the bifurcated ends 1 of the clutch-lever L, which is mounted for horizontal movement upon the extension $b^5$ of the bracket B. The clutch member 8 has a pair of oppositely-disposed cam-faces $8^a$ $8^a$, which when the clutch member is moved into engagement with the lever 8 engage the cam-face $6^x$ thereof to rock the said lever on its fulcrum 10 (see dotted lines, Fig. 2) to cause the arm $6^b$ to draw the clutch-band 7 into tight frictional engagement with its respective clutch-flange $3^d$ or $4^d$, as the case may be.

So far as described it will be seen that when the clutch 8 has its cam-face $8^a$ in engagement with the lever $6^a$ to the right of Fig. 1 the clutch-band 7 will tightly engage the clutch-flange $4^d$ of the pulley 4, causing it to rotate in the same direction as the shaft A, which through the gear D will impart reverse movement to the pulley 3; but when the clutch-flange $8^a$ engages with the lever $6^a$ to the left of Fig. 1 the other clutch-band 7 will engage the flange $3^d$ to impart motion to the pulley 3 in the same direction as the shaft A.

From the foregoing description, taken in connection with the accompanying drawings, it is thought the advantages and complete operation of my reversing-gear mechanism will be readily apparent to those skilled in the art to which it appertains.

Having thus described my invention, what I claim, and desire to secure by Letters Patent, is—

1. In a gear mechanism, a shaft, a plurality of pulleys loosely mounted thereon, said pulleys each having a gear-rim and a clutch-flange, an idler-gear connecting said gear-rims of said pulleys, a hub mounted upon said shaft between said pulleys, clutch-bands mounted upon said hub, cam-levers carried by said hub and connected to said clutch-bands, means for operating said cam-levers, to cause said bands to engage said flanges, for the purposes specified.

2. In a gear mechanism, a shaft, a plurality of pulleys loosely mounted thereon, said pulleys each including a gear-rim and a clutch-flange, an idler-gear connecting said gear-rims of said pulleys, a hub mounted upon said shaft to turn therewith and between said pulleys, clutch-bands mounted upon said hub, cam-levers carried by said hub and connected to said clutch-bands, a clutch member mounted upon said hub, and having cam-faces for coöperating with the cam-faces of said cam-levers, and means for moving said clutch member into engagement with said levers.

3. In a reversing-gear mechanism of the character described, the combination with a pair of pulleys loosely mounted upon the shaft, each of which has a gear-rim and a clutch-flange, the said pulleys being arranged with their gear and clutch faces opposite each other, an idler-gear which connects with the gear-rims of the two pulleys, a hub fixedly mounted on the shaft of the two pulleys, a clutch-lever mounted upon each end of the said hub and a means mounted upon each end of the hub for actuating the said levers whereby to move them into engagement with the hub substantially as shown and described.

WILLIAM J. WRIGHT.

Witnesses:
ROBERT N. SPEER,
FRED G. DIETERICH.